(12) United States Patent
Brichford et al.

(10) Patent No.: US 8,627,216 B2
(45) Date of Patent: Jan. 7, 2014

(54) RENDERING HYPERTEXT MARKUP LANGUAGE CONTENT

(75) Inventors: Christopher Brichford, Menlo Park, CA (US); Edward R. W. Rowe, Sunnyvale, CA (US); Kevin Lynch, San Francisco, CA (US); Ethan Malasky, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 894 days.

(21) Appl. No.: 12/573,511

(22) Filed: Oct. 5, 2009

(65) Prior Publication Data

US 2010/0023884 A1 Jan. 28, 2010

Related U.S. Application Data

(63) Continuation of application No. 11/585,661, filed on Oct. 23, 2006, now Pat. No. 7,614,003.

(51) Int. Cl.
*G06F 3/00* (2006.01)
*G06F 3/01* (2006.01)

(52) U.S. Cl.
USPC ........... 715/760; 715/234; 715/237; 715/239; 715/242

(58) Field of Classification Search
USPC .................. 715/760, 234, 237, 239, 242
See application file for complete search history.

(56) References Cited

U.S. PATENT DOCUMENTS

| | | | |
|---|---|---|---|
| 5,511,217 A | 4/1996 | Nakajima et al. | |
| 5,978,584 A | 11/1999 | Nishibata et al. | |
| 6,057,854 A * | 5/2000 | Davis et al. | 345/619 |
| 6,256,772 B1 | 7/2001 | Apte et al. | |
| 6,415,278 B1 | 7/2002 | Sweet et al. | |
| 6,552,732 B1 * | 4/2003 | Davis et al. | 345/619 |
| 6,558,431 B1 | 5/2003 | Lynch et al. | |
| 6,609,158 B1 | 8/2003 | Nevarez et al. | |
| 6,658,600 B1 | 12/2003 | Hogdal et al. | |
| 6,675,230 B1 | 1/2004 | Lewallen | |
| 6,687,745 B1 | 2/2004 | Franco et al. | |
| 6,691,176 B1 | 2/2004 | Narin et al. | |
| 6,779,172 B1 * | 8/2004 | Weerawarana et al. | 717/115 |
| 6,801,224 B1 | 10/2004 | Lewallen | |
| 6,812,941 B1 | 11/2004 | Brown et al. | |
| 6,865,599 B2 | 3/2005 | Zhang | |
| 6,873,343 B2 | 3/2005 | Chui | |
| 6,892,200 B2 * | 5/2005 | Eich | 707/704 |

(Continued)

OTHER PUBLICATIONS e.wikipedia.org et. al; Opera Web Browser) extracted Oct. 23, 2012; pp. 1-21.*
W3C.org et al.; "Scalable Vector Graphics (SVG) Tiny 1.2 Specification" Aug. 10, 2006, 1 page.*
http://www.webkit.org/blog/74/adobe.apollo.uses.webkit et al. "Surfin Safari" posted Oct. 30, 2006 pp. 1-6.*

(Continued)

*Primary Examiner* — Steven B Theriault
(74) *Attorney, Agent, or Firm* — Wolfe-SBMC (57) ABSTRACT

In general, one aspect of the subject matter described in this specification can be embodied in a method that includes rendering Hyper Text Markup Language (HTML) content, in an HTML rendering engine, to primitives of a vector graphics rendering engine; rendering the primitives, in the vector graphics rendering engine, to provide a user interface; receiving an input event via the user interface; determining, in the HTML rendering engine, a change in appearance for the user interface based on the input event; and updating at least one of the primitives for rendering by the vector graphics rendering engine in accordance with the change in appearance to update the user interface.

18 Claims, 3 Drawing Sheets

(56) References Cited

U.S. PATENT DOCUMENTS

| | | | |
|---|---|---|---|
| 6,898,786 B1* | 5/2005 | Sokolov | 717/139 |
| 6,922,200 B1 | 7/2005 | Marques | |
| 7,058,955 B2* | 6/2006 | Porkka | 719/314 |
| 7,088,374 B2 | 8/2006 | David et al. | |
| 7,103,585 B2* | 9/2006 | Jowell et al. | 706/45 |
| 7,117,504 B2 | 10/2006 | Smith et al. | |
| 7,158,878 B2 | 1/2007 | Rasmussen et al. | |
| 7,161,599 B2 | 1/2007 | Beda et al. | |
| 7,210,095 B1 | 4/2007 | Mor | |
| 7,257,771 B2* | 8/2007 | Buser et al. | 715/239 |
| 7,265,756 B2 | 9/2007 | Schneider et al. | |
| 7,287,274 B1 | 10/2007 | Houlding | |
| 7,340,718 B2 | 3/2008 | Szladovics et al. | |
| 7,346,897 B2* | 3/2008 | Vargas | 717/137 |
| 7,430,343 B2 | 9/2008 | Hayes et al. | |
| 7,486,294 B2 | 2/2009 | Beda et al. | |
| 7,546,607 B2 | 6/2009 | Demsey et al. | |
| 7,614,003 B2 | 11/2009 | Brichford et al. | |
| 7,823,164 B2* | 10/2010 | Gibbs et al. | 719/313 |
| 7,958,457 B1* | 6/2011 | Brandenberg et al. | 715/789 |
| 7,971,194 B1* | 6/2011 | Gilboa | 717/136 |
| 8,020,089 B1 | 9/2011 | Brichford et al. | |
| 2001/0032221 A1 | 10/2001 | Anwar | |
| 2002/0109729 A1 | 8/2002 | Dutta | |
| 2002/0120918 A1 | 8/2002 | Aizenbud-Reshef et al. | |
| 2002/0156881 A1 | 10/2002 | Klopp Lemon et al. | |
| 2002/0178141 A1 | 11/2002 | Kushnirskiy | |
| 2003/0097421 A1* | 5/2003 | Wille et al. | 709/217 |
| 2003/0101235 A1 | 5/2003 | Zhang | |
| 2003/0105883 A1 | 6/2003 | Gibbons | |
| 2003/0121000 A1 | 6/2003 | Cooper et al. | |
| 2003/0126311 A1 | 7/2003 | Kushnirskiy et al. | |
| 2003/0217086 A1 | 11/2003 | Kushnirskiy et al. | |
| 2004/0015940 A1 | 1/2004 | Heisey et al. | |
| 2004/0056894 A1 | 3/2004 | Zaika et al. | |
| 2004/0098731 A1 | 5/2004 | Demsey et al. | |
| 2004/0111672 A1 | 6/2004 | Bowman et al. | |
| 2004/0111673 A1 | 6/2004 | Bowman et al. | |
| 2004/0189667 A1 | 9/2004 | Beda et al. | |
| 2004/0189669 A1 | 9/2004 | David et al. | |
| 2004/0194020 A1 | 9/2004 | Beda et al. | |
| 2004/0223009 A1 | 11/2004 | Szladovics et al. | |
| 2004/0225491 A1* | 11/2004 | Chang | 704/2 |
| 2005/0146533 A1 | 7/2005 | Sanborn et al. | |
| 2005/0216895 A1 | 9/2005 | Tran | |
| 2005/0268216 A1 | 12/2005 | Hayes et al. | |
| 2006/0010246 A1 | 1/2006 | Schulz et al. | |
| 2006/0026526 A1 | 2/2006 | Simister et al. | |
| 2006/0048051 A1 | 3/2006 | Lazaridis | |
| 2006/0103665 A1 | 5/2006 | Opala et al. | |
| 2006/0112167 A1 | 5/2006 | Steele et al. | |
| 2006/0123360 A1 | 6/2006 | Anwar et al. | |
| 2006/0152511 A1 | 7/2006 | Whatmough | |
| 2007/0013697 A1 | 1/2007 | Gilboa | |
| 2007/0089048 A1 | 4/2007 | Lacey et al. | |
| 2007/0094672 A1 | 4/2007 | Hayton et al. | |
| 2007/0113237 A1* | 5/2007 | Hickson | 719/318 |
| 2007/0192818 A1* | 8/2007 | Bourges-Sevenier et al. | 725/132 |
| 2007/0198918 A1 | 8/2007 | Mor | |
| 2007/0256055 A1 | 11/2007 | Herscu | |
| 2007/0288855 A1 | 12/2007 | Rohrabaugh et al. | |
| 2008/0082907 A1 | 4/2008 | Sorotokin et al. | |
| 2008/0127170 A1 | 5/2008 | Goldman et al. | |

OTHER PUBLICATIONS

Adobe inc. et al. "Apollo: Developer FAQ" Oct. 2006.*
Peters, Keith et. al. "What I learned at FITC in Hollywood" Oct. 2006.*
Ryan Stewart et al. "Unofficial Apollo FAQ", http://web.archive.org/web/20060512020438/http://www/digitalbackcountry.com/index.com.*
Amit Agarwal et. al. "Adobe Apollo= Acrobat Reader+Flash Player"; http://labnol.blogspot.com/2005/12/adobe-apollo-acrobat-reader-flash.html; Dec. 2005, pp. 1-4.*
Lamonica, Martin et. al. "Flash to Jump Beyond the Browser" May 11, 2006, p. 1-10.*
Greenfield et al. "Flex-Ajax Bridge" Jul. 2006.*
Chambers et. al. "Apollo" 2005.*
Adobe Inc. et. al. Adobe labs.com "Apollo" Oct. 2006.*
Adobe et. al. Oh, Apollo (technical overview and 21 questions) Oct. 2006.*
Lynch, Kevin et al. The Origins of Apollo Mar. 2007.*
Ryan Stewart et al. "Unofficial Apollo FAQ", http://web.archive.org/web/20060512020438/http://www/digitalbackcountry.com/index.com ; May 12, 2006.*
"About the Browser", downloaded from the internet on Oct. 10, 2006 at http://msdn.microsoft.com/workshop/browser/overview/Overview.asp?frame=true, 2006, 6 pages.
Aitken, "An Introductory Look at Windows Presentation Foundation: Part 1", downloaded from the internet on Sep. 6, 2006 at http://www.devsource.com/article2/0,1895,1965448,00.asp, May 21, 2006, 2 pages.
"An Introductory Look at Windows Presentation Foundation: Part 1, Getting the Beta Tools", downloaded from the internet on Sep. 6, 2006 at http://www.devsource.com/article2/0,1895,1965449,00.asp, 4 pages.
"An Introductory Look at Windows Presentation Foundation: Part 1, Layout Containers", downloaded from the internet on Sep. 6, 2006 at http://www.devsource.com/article2/0,1895,1965450,00.asp, 4 pages.
Bojanic, "The Joy of XUL", downloaded from the internet on Oct. 16, 2006 at http://developer.mozilla.org/en/docs/The_Joy_of_XUL, 5 pages.
Roberts, "Take Total Control of Internet Explorer with Advanced Hosting Interfaces", downloaded from the internet on Oct. 10, 2006 at http:/www.microsoft.com/mind/1098/advhost/advhost.asp, Oct. 1998, 9 pages.
"Windows Presentation Foundation", downloaded from the internet on Oct. 16, 2006 at http://msdn2.microsoft.com/en-us/netframework/aa663326(d=printer).aspx, 2006, 2 pages.
"XML User Interface Language (XUL) Project", downloaded from the internet on Oct. 16, 2006 at http://mozilla.org/projects/xul, 1 page.
Ajaxian.com, "Adobe Announces a Flex/Ajax Bridge", (Mar. 7, 2006), [retrieved from http://ajaxian.com/archives/adobe-announces-a-flex-ajax-bridge on Nov. 1, 2011] 5 pages.
Berkovitz, J., "An ActionScript interpreter, courtesy of JavaScript and Apollo", (Apr. 12, 2007), [retrieved from http://joeberkovitz.com/blog/2007/04/12/an-actionscript-interpreter-courtesy-of-javascript-and-apollo/ on Nov. 1, 2011] 3 pages.
Chambers, M.; Dixon, R.; Swartz, J., "Apollo for Adobe Flex Developers: Pocket Guide", (Mar. 2007), O'Reilly Media, Inc., 139 pages.
Flanagan, D., "JavaScript: The Definitive Guide", 5th Ed. (Aug. 2006), O'Reilly Media, Inc., pp. 263-264, 582-591 (14 pages).
Lott, J.; Schall, D.; Peters, K., "Action Script 3.0 Cookbook", (Oct. 11, 2006), O'Reilly Media, Inc., pp. 494-498 [retrieved from http://academic.safaribooksonline.com/book/programming/actionscript/0596526954 on Oct. 27, 2011] 14 pages.
Ralston, A.; Reilly, E.D.; Hemmendinger, D., "Encyclopedia of Computer Science", 4th Ed. (2000), Nature Publishing Group, pp. 1391-1396, 1414-1417 (12 pages).
Taft, D., "Adobe Bridges Flash, Flex with AJAX", (Mar. 8, 2006), [retrieved from http://www.eweek.com/index2.php?option=content&task=view&id=898&pop= 1 &hide_ads= 1 &page=O&hide..Js= 1 &catid= 13 on Nov. 1, 2011] 2 pages.
"Advisor Action", U.S. Appl. No. 11/585,661, (Mar. 9, 2009), 3 pages.
"Final Office Action", U.S. Appl. No. 11/585,661, (Dec. 18, 2008),11 pages.
"Non-Final Office Action", U.S. Appl. No. 11/585,661, (Jun. 26, 2008), 9 pages.
"Notice of Allowance", U.S. Appl. No. 11/585,661, (Jun. 26, 2009), 6 pages.

* cited by examiner

RENDERING HYPERTEXT MARKUP LANGUAGE CONTENT

CROSS-REFERENCE TO RELATED APPLICATIONS

This application is a continuation of and claims priority under 35 U.S.C. §120 to U.S. patent application Ser. No. 11/585,661, entitled "RENDERING HYPERTEXT MARKUP LANGUAGE CONTENT," filed on Oct. 23, 2006 now U.S. Pat. No. 7,614,003, the entire contents of which are incorporated herein by reference. This application is related to U.S. patent application Ser. No. 11/512,764, entitled SOFTWARE INSTALLATION AND SUPPORT, to O. Goldman et al., which is hereby incorporated by reference.

BACKGROUND

The present disclosure relates to rendering hypertext markup language (HTML) content. HTML is an authoring language commonly used to create documents on the World Wide Web. HTML defines the structure and layout of a Web document using a variety of tags and attributes, which an HTML rendering engine interprets when processing HTML content. Typically, a Web browser employs an HTML rendering engine to render HTML content to a display device. In other cases, HTML content has been rendered statically to another format before display to a user, such as using the Web Capture feature in ADOBE ACROBAT® software provided by Adobe Systems Incorporated of San Jose, Calif.

In addition, the HTML rendering engine typically uses a document object model (DOM) when rendering HTML content, such as by using the DOM when rendering dynamic HTML (DHTML), to dynamically change the appearance of Web pages after they have been downloaded to the Web browser. The DOM maintains an internal document representation and implements the DOM application program interface (API). JavaScript embedded in an HTML document can directly access the current document through the DOM API, and make changes or read the content.

A virtual machine (VM) is a self-contained operating environment that behaves as if it is a separate computer. For example, JAVA® applets run in a JAVA® Virtual Machine (JVM) (available from Sun Microsystems, Inc.), which has been implemented for many different computer platforms. The JVM provides a runtime environment and Java interpreter for most operating systems, including WINDOWS® OS, MAC® OS, AND LINUX® OS. Moreover, the JVM has been implemented as a Web browser plug-in.

Flash® Player (available from Adobe Systems Incorporated) is another virtual machine, which is used to run, or parse, Flash® files including ActionScript or Shockwave Flash (SWF). The Flash® Player has also been implemented as a Web browser plug-in. Thus, HTML content that is rendered by a Web browser can include SWF data.

SUMMARY

This specification describes technologies relating to rendering hypertext markup language content. In general, one aspect of the subject matter described in this specification can be embodied in a method that includes rendering Hyper Text Markup Language (HTML) content, in an HTML rendering engine, to primitives of a vector graphics rendering engine; rendering the primitives, in the vector graphics rendering engine, to provide a user interface; receiving an input event via the user interface; determining, in the HTML rendering engine, a change in appearance for the user interface based on the input event; and updating at least one of the primitives for rendering by the vector graphics rendering engine in accordance with the change in appearance to update the user interface. Other embodiments of this aspect include corresponding systems, apparatus, and computer program products (a computer program product, encoded on a computer-readable medium, operable to cause data processing apparatus to perform operations of the method).

These and other embodiments can optionally include one or more of the following features. The determining can include determining that the change in appearance affects only a portion of the user interface, and the updating can include updating only primitives that intersect the portion of the user interface affected by the change. The method can further include bridging between a first script engine used by the HTML rendering engine and a second script engine used by the vector graphics rendering engine. The bridging can include generating objects for the first script engine that represent objects in the second script engine and generating objects for the second script engine that represent objects in the first script engine.

The method can further include causing the first script engine to employ a garbage collector of the second script engine. The method can include maintaining security model integrity by cross checking security context information for objects of the first and second script engines. Moreover, the method can include maintaining security model integrity by cross checking domain information for the HTML content and native content of the vector graphics rendering engine.

In addition, another aspect of the subject matter described in this specification can be embodied in a system that includes an input device; a display device; a computer platform including an operating system and a virtual machine, the virtual machine configured to create a virtualized environment between the computer platform and a software application programmed to operate on the virtual machine; and the virtual machine operable to generate a user interface for the software application, using the input device and the display device, by rendering and dynamically updating interactive HTML content through a vector graphics rendering engine. The virtual machine can include an HTML rendering engine configured to render the interactive HTML content to primitives of the vector graphics rendering engine, and the virtual machine can include the vector graphics rendering engine configured to render the primitives to provide the user interface.

The HTML rendering engine can be configured to retain information regarding the rendered primitives, to determine that a change in appearance for the user interface, caused by an input event, affects only a portion of the user interface, and to update only primitives that intersect the portion of the user interface affected by the change. The virtual machine can include a first script engine used by the HTML rendering engine and a second script engine used by the vector graphics rendering engine, and the virtual machine can be configured to employ bridging objects between the first script engine and the second script engine.

The first script engine can be configured to employ a garbage collector of the second script engine, and the virtual machine can be configured to cross check security context information for objects of the first and second script engines to maintain security model integrity. The virtual machine can be configured to cross check domain information for the interactive HTML content and native content of the vector graphics rendering engine to maintain security model integrity. Moreover, the computer platform, the input device and the display device can be one personal computer.

Particular embodiments of the subject matter described in this specification can be implemented to realize one or more of the following advantages. A software platform can support HTML-based desktop applications that are independent of the underlying computer platform (hardware/firmware+operating system). The HTML-based desktop applications can function within the operating system just as normal desktop applications (e.g., with install packages, desktop icons, and uninstall option through an add-remove programs utility of the operating system). The desktop applications can employ HTML to generate their user interfaces, including potentially generating the entire user interface for an application using HTML, generating a portion of the user interface for an application using HTML, or embedding a Web browser type element within the user interface of an application.

The software platform can employ a cross-platform runtime that uses a vector graphics rendering engine to display the graphical user interface of the desktop applications. The runtime can support other Web based and cross-platform technologies in addition to HTML, such as a scripting language (e.g., JavaScript and ActionScript), a cross-platform document format (e.g., Portable Document Format (PDF)), and cross-platform interpreted code (e.g., Flash® code). Thus, the runtime can allow the use of Web technologies to create desktop applications, and the large number of software engineers and designers that are familiar with Web technologies and can create Web sites and Web applications, can also create desktop applications that fully control their appearance and run on a computer that is not connected to a network. Moreover, the system can manage privileges granted to such applications, where the privilege level granted to the application can be higher than privileges granted to content loaded by the application (e.g., the application may be granted access to local disk, while HTML loaded from a remote web site may be denied such access), and users or system administrators can be allowed to configure such privilege levels as desired.

The details of one or more embodiments of the invention are set forth in the accompanying drawings and the description below. Other features, aspects, and advantages of the invention will become apparent from the description, the drawings, and the claims.

DETAILED DESCRIPTION

Figure 1:
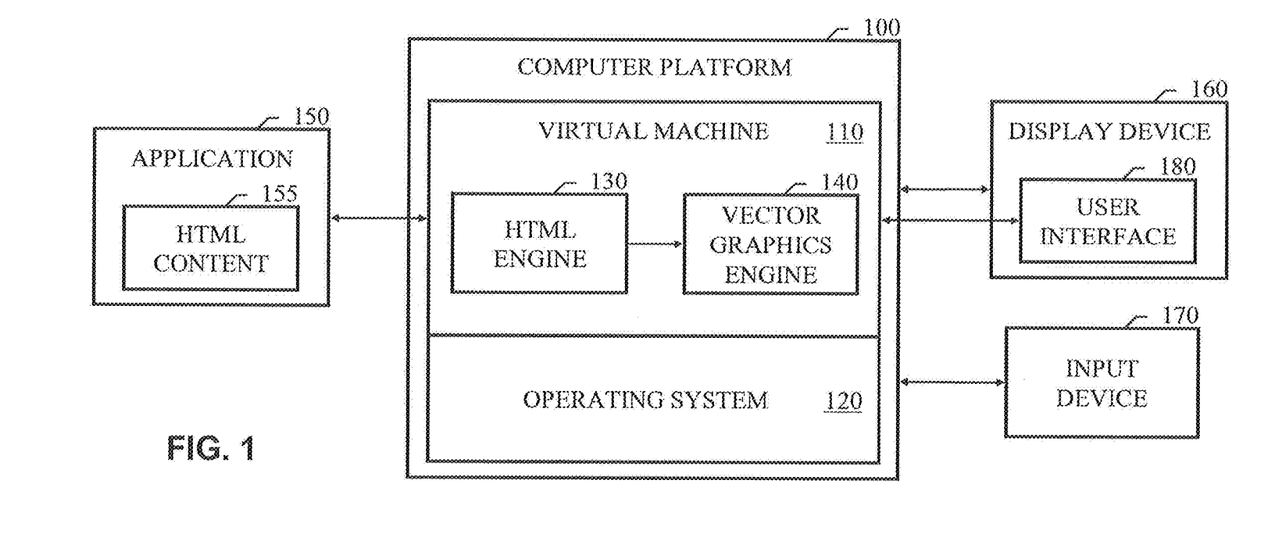
FIG. 1 shows an example system including a virtual machine serving as a software platform for application software.

FIG. 1 shows an example system including a virtual machine serving as a software platform for application software. A computer platform 100 is a data processing apparatus, with appropriate hardware, that includes a particular operating system (OS) 120 for that data processing apparatus (e.g., WINDOWS® OS, MAC® OS, or LINUX® OS). The computer platform 100 includes virtual machine 110. The virtual machine 110 is a runtime environment that provides software services for processes or programs while a computer is running. The virtual machine 110 can include (or be considered one and the same with) a runtime library, which is a collection of utility functions that support a program while it is running, often working with the OS 120 to provide facilities. The virtual machine 110 can be client-based software that runs Flash® applications, supports vector and raster graphics, bidirectional streaming of audio and video and one or more scripting languages (e.g., JavaScript and ActionScript). Moreover, the virtual machine 110 can deeply integrate Flash® applications with the OS, providing services such as file system access, multiple windows, running in the background, etc.

An application 150 can rely on the runtime library to operate; for example, an application 150 can be a Flash® application that uses SWF and runs on a computer using a client-based runtime library that runs Flash® applications separately from a web browser, whether online or offline. As used herein, an "application" refers to a computer program that the user perceives as a distinct computer tool used for a defined purpose. While the application 150 can be dependent on the virtual machine 110 to operate on the computer platform 100, the application 150 can also control its appearance and can run on the computer platform 100 even when not connected to a network. Thus, the application 150 can be viewed as a desktop application within the computer platform 100, even though the application 150 can run on the virtual machine 110 and thereby be platform independent.

The application 150 includes hyptertext markup language (HTML) content 155 that is used in generating a user interface 180 for the application 150. Other code content can also be used to generate the user interface 180 by the application 150. For example, the application 150 can include SWF code used in generating the user interface 180, and the HTML content 155 can be included with the SWF code.

The virtual machine 110 can include an HTML rendering engine 130 and a vector graphics rendering engine 140, which interact to present the user interface 180 on a display device 160, and to update the user interface 180 based on input events received via the user interface 180 in combination with an input device 170. The operating system 120 can receive input events from the input device 170 and pass these input events to the virtual machine 110. The virtual machine 110 can give those events to the code that includes the vector graphics rendering engine 140, which can in turn pass those events to the HTML rendering engine 130 as appropriate.

The display device 160 can include a CRT (cathode ray tube) or LCD (liquid crystal display) monitor, for displaying information to a user, and the input device 170 can include a keyboard and a pointing device (e.g., a mouse or a trackball) by which the user can provide input to the system. It should be appreciated that the computer platform 100, the display device 160 and the input device 170 can together be included in a single system or device, such as a personal computer, a mobile telephone, a personal digital assistant (PDA), a mobile audio player, a Global Positioning System (GPS) receiver, to name just a few.

The HTML content 155 can be made interactive for a user in a variety of manners. The HTML content 155 can include DHTML, can include script (e.g., JavaScript), can include CSS (Cascading Style Sheets), or can include some combination of them. The HTML engine 130 can render the interactive HTML content 155 to primitives of the vector graphics engine 140. These primitives can include vector graphics (e.g., rectangles, ovals and fonts) and also raster graphics (e.g., a bitmap or Portable Network Graphics (PNG) image). As will be appreciated, raster graphics are distinct from vector graphics in that vector graphics represent an image using geometric objects such as curves and polygons, whereas raster graphics represent an image using a grid of pixels. Nonetheless, the primitives supported by the vector graphics rendering engine 140 can include both vector graphics and raster graphics.

The HTML engine 130 can also forward requests for external resources (images, frames, style sheets, scripts, etc.) to the vector graphics engine 140 or a related component of the virtual machine 110. This can be done to address security issues, which are addressed in detail below, and also to improve the end user's experience. For example, when the application 150 connects to a secure site on a network (e.g. the Internet), and the user of the application 150 typically will have to type in a password. If the HTML engine 130 connects to the network in a different manner than the vector graphics engine 140, the user might be forced to type in her password twice to get access to both HTML content and native content of the vector graphics engine 140. However, by forwarding resource requests from the HTML engine 130 into the vector graphics engine 140 (or the related component), the entered password can be tracked and the user need only type in her password once.

The virtual machine 110 can employ a managed environment in which privileges granted to the application 150 can be configured by a user or by a system administrator on a per-application basis. For example Application A running as User U may not be allowed to read or write files in "C:\Program Files", but Application B running as User U may be allowed to read files in "C:\Program Files". While these applications can run with higher privilege than web-based applications (e.g., they can read and write to the local disk), they can easily load content that should be prevented from using that high privilege. For example, a desktop application written in HTML can open a new window and load www-cnn-com into that new window. In such a case, the desktop application's HTML code can be permitted to read and write to local disk, while the HTML code from www-cnn-com can be prevented from reading or writing to local disk. This can be the default configuration for the virtual machine 110, but this configuration can also be changed, either by a user or system administrator, or by a mechanism through which code having a particular privilege level can confer that privilege level to other code (that otherwise does not have that privilege level) at runtime.

In addition, the vector graphics rendering engine 140 can employ a retained graphics mode in which the primitives that are rendered to a frame are kept track of for the lifetime of the frame. When the frame changes, the vector graphics rendering engine 140 need only modify and update the primitives that have a new state. For example, the vector graphics rendering engine 140 can be a Flash® rendering engine.

The retained graphics mode can be extended to the HTML rendering engine 130 such that the HTML engine 130 keeps track of the correlation between the HTML content 155 and the primitives rendered to the vector graphics rendering engine 140. When changes are then made in the HTML elements of the user interface 180 (e.g., because the mouse moved over a roll-over element or a menu element pops out), the HTML engine 130 need only regenerate and forward to the vector graphics engine 140 the corresponding primitives that are affected by the change. Thus, only those primitives that intersect the portion of the user interface affected by the change need be updated by the HTML rendering engine 130.

Figure 2:
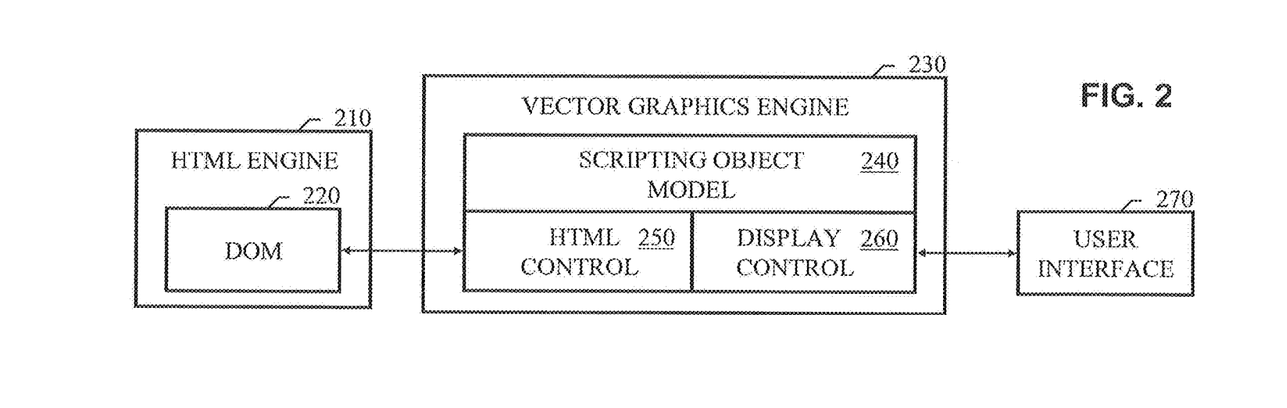
FIG. 2 shows example components of a hypertext markup language engine and a vector graphics engine that interact to present a user interface.

FIG. 2 shows example components of an HTML engine 210 and a vector graphics engine 230 that interact to present a user interface 270. The HTML engine 210 includes a DOM 220 for a given set of HTML content, which can include a script of a first script type (e.g., JavaScript). The vector graphics engine 230 includes an instance of a scripting object model 240 for a second script type (e.g., ActionScript). The scripting object model 240 includes a display control 260 that is used to generate the user interface 270. The display control 260 can be an instance of a display class in the scripting object model 240, which provides a basic display list building block: a display list node that can display graphics and can also contain children.

The display control 260 can be extended by an HTML control 250 that interfaces with the DOM 220. For example, an HTML class can extend a display class and provide an application program interface (API) to the HTML functionality in the virtual machine 110. As an extension of the display control class, the HTML control class allows the HTML control 250 to be added to the display list once it is constructed as the child of any other display control 260 that can have children.

The following description addresses the details for allowing a user of the HTML control class (e.g., the desktop application programmer) to implement various behaviors within the context of this class based scheme. However, it should be appreciated that other implementations are also possible. For example, an events based scheme can be employed. Events can have advantages in that it is generally simpler to hook up event handlers, and events can be handled by more than one listener. However, returning state to the dispatcher of an event using event handlers can raise issues, since returning state in such implementations typically involves communicating a Boolean that indicates whether or not the dispatcher should execute some default logic after dispatching the event.

An interface based scheme can also be employed. Such a scheme can have advantages over an events based scheme since interfaces are generally more type safe than events, can readily return state, and only one handler is invoked (compared to events where any number of handlers can be registered for an event). However, an interface based scheme can require specification of a new class, while also potentially compromising backward compatibility in the event that additional methods are added to the interface at a later time.

In contrast, using subclassing, the needed behaviors can be implemented as overrideable methods on the HTML control class described herein. Allowing users of the HTML control to subclass the HTML control and override some its methods can provide most, if not all of the benefits of having an interface to implement the needed behaviors. If new behaviors are to be implemented by users of the HTML control in the future, existing application code will not necessarily need to be changed. In fact, all of the behaviors of the window object and of default DOM event handlers can be implemented as overrideable methods on the HTML control.

The HTML control can allow first script type code (e.g., JavaScript) in the HTML control to hold references to, call methods on, and access properties of objects of the second script type. The HTML control can also allow second script type code (e.g., ActionScript) to hold references to, call methods on, and access properties of objects of the first script type code. For example, ActionScript can access the window object of the JavaScript running in the HTML control via a windowObject property; the ActionScript can then add properties to the window object whose values are references to ActionScript objects (including method closures).

The virtual machine's APIs exposed into the first script type object model can be second script type function closures that are bridged into the first script engine. Second script type code can also use the windowObject property to access the first script type object for the top level window object in the HTML contained by the HTML control. Second script type code can then set additional properties on the window object. Those additional properties can have values that are function closures that can be called from the first script type code. Those function closures can return second script type objects that get bridged into the first script engine. Script of the second type can instantiate script objects of the first type by finding the constructor for a first script type object in the window object of the HTML control.

The second type script can access the window object at anytime, however the HTML control's reference to the window object can be released, and a new window can be recreated shortly after or during any method that loads new content into the HTML control. A "complete" event can signal that all load-time processing of the HTML is complete and can also be a good time for second type script to manipulate the first type script object model. Moreover, anytime an HTML window object is referenced, a call can be made to a Security Manager to ensure the caller has permission to access the object model of the HTML window in question. Further example details of such bridging between a first script engine and a second script engine, while maintaining security model integrity, are described below in connection with FIG. 4.

Figure 3:
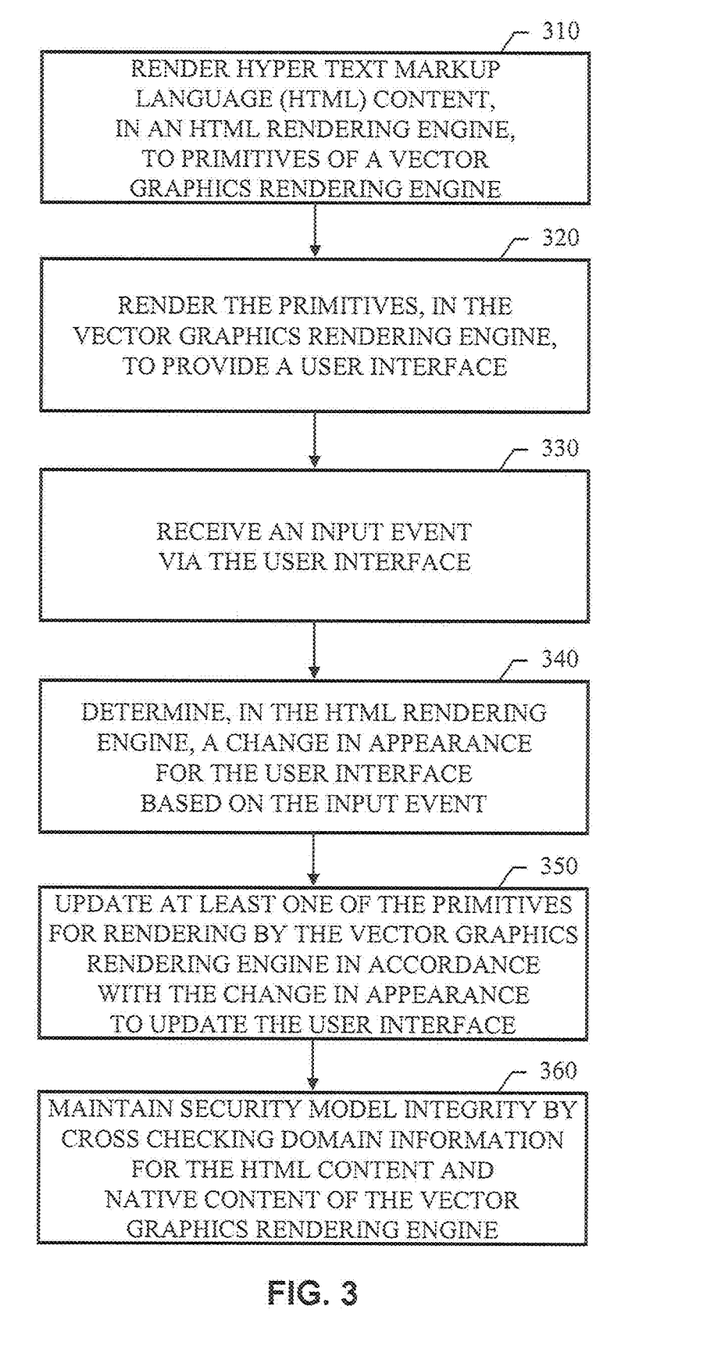
FIG. 3 shows an example process of rendering hypertext markup language content through a vector graphics rendering engine.

FIG. 3 shows an example process of rendering hypertext markup language content through a vector graphics rendering engine. HTML content can be rendered 310, in an HTML rendering engine, to primitives of a vector graphics rendering engine. This can involve rendering the HTML content to one or more raster images when raster graphics are included in the primitives of the vector graphics rendering engine. This can involve rendering the HTML content to vector graphics, which can result in crisper views and improved performance (e.g., for any video embedded inside the HTML content).

The primitives can be rendered 320, in the vector graphics rendering engine, to provide a user interface (UI). For example, the HTML control described above can be by default an embedded browser whose functionality is modeled after an HTML IFRAME element. An embedded browser is generally a superset of the functionality used to implement a container to render HTML as part of the UI of an application. Thus, the HTML control can be used to render an HTML UI through the vector graphics engine without subclassing the HTML control. If the default implementation of any of the HTML control's behaviors are not desired, then the HTML for the UI can be written not to exercise that behavior. For example, if the developer does not want the user to be able to navigate the control, then the developer can choose to write the HTML such that it contains no external links and no JavaScript calls to window.location, window.history.go, etc. If the developer wants more control, she can subclass the HTML control and override the methods that implement various behaviors (such as what happens when a link is clicked on).

An input event can be received 330 via the user interface. A change in appearance for the user interface can be determined 340, in the HTML rendering engine, based on the input event. At least one of the primitives can be updated 350 for rendering by the vector graphics rendering engine in accordance with the change in appearance to update the user interface. The determining can involve determining that the change in appearance affects only a portion of the user interface, and the updating can include updating only primitives that intersect the portion of the user interface affected by the change (e.g., only the vector graphic(s) affected by the change, or only the raster graphic region(s) of the user interface affected by the change).

The updating can be designed to regenerated as little of the user interface as possible to improve system performance. For example, for each primitive (e.g., rectangle, oval, image, etc.) sent to the vector graphics rendering engine by the HTML rendering engine, the HTML rendering engine can store a reference that is maintained until the user navigates away from the HTML content; and while changes are made to the user interface within the context of the HTML content, only the primitives affected by those changes need be updated.

For example, for every DOM node of the HTML content, a pointer can be attached to identify the one or more primitives that the given node generates. When the cursor in the UI moves on top of a UI element corresponding to a given DOM node (e.g., a DOM node that corresponds to a menu item), that DOM node receives an event. The DOM node can include JavaScript that effects a color change in response to that event, in which case, the primitive(s) that represent the given node can be located, the color updated, and the new primitive(s) can be sent to the vector graphics engine for rendering to the display. Alternatively, the UI can be implemented using a single primitive (a single raster image), which is then updated for any change in the UI.

In the context of the HTML control described above in connection with FIG. 2, the HTML control can defer the implementation of certain behaviors to the user of the HTML control. These behaviors can be either default event handlers for DOM events or implementations of properties and methods of the JavaScript object model. Users of the HTML control can implement these behaviors by subclassing the HTML control and overriding second type script methods (e.g., ActionScript methods) that correspond to the behaviors they want to control.

When JavaScript in an HTML document does not handle a mouse or keyboard event, that event can be handled by a default event handler in the HTML engine. For things like a link, that default action may be to navigate to a new URL (Universal Resource Locator). The HTML engine used by the HTML control can decide when default actions are invoked. In the case of clicking on a link, the JavaScript onClick handlers can execute before the default handler executes, and the JavaScript onClick handlers can prevent the default hander from being invoked. If the HTML engine invokes the default handler, then a second type script method (e.g., an ActionScript method) on the HTML control can be invoked by the HTML control.

Similarly, if mouse down and mouse move on an image are not handled by JavaScript, the embedded browser can tell the virtual machine's drag manager to start a drag loop such that the image can be dragged on to the desktop or another application that accepts images. The HTML control can allow these default behaviors to be implemented in the second type scripting language (e.g., ActionScript) by the user of the HTML control.

When the default handlers have been invoked, the event can have already been through a bubble phase inside of the HTML content. By default all bubbling events can bubble out of the HTML control subject to security checks, such as described further below. A bubbling event can bubble through each display list object, but the event handlers on each display list object need only be invoked if those handlers have access to the object model of the target of the event. If a bubbling event bubbles out, the default behavior need not execute until the event has bubbled to the top of the display list. However, the default behavior handlers are not called if a preventDefault is called on the event object.

When the HTML Control receives an event during the capture phase, the HTML control can forward the event to the HTML DOM. At that point the HTML engine can find the DOM that contains the target of the event inside of the HTML control (i.e., the target DOM). The target DOM can be the DOM of an IFRAME element or a FRAME element. The HTML engine can then execute the capture, target, and bubble phases through the target DOM. The target phase can result in the event being forwarded to another DisplayObject tree in which the capture, target, and bubble phases are run. After the bubble phase in the target DOM has completed the event, the capture phase of the event in the display list that contains the HTMLControl can be complete. If the event bubbled out of the target DOM in the HTML control, the HTML control can then allow the event to bubble out of the HTML control and up the display list that contains the HTML control. Note that HTML does not generally allow JavaScript to capture or bubble events targeted at an element in an IFRAME element or FRAME element.

Events (error events, abort events, and user defined events) originating in the HTML control can bubble out of the HTML control if they bubble through the HTML DOM. If a user of the HTML control never wants a certain type of event to bubble out of the HTML control, she can put the HTML control in a container that prevents events of that type from bubbling out of that container.

When HTML is the root content of a desktop application that relies on the virtual machine, the runtime can load preexisting code (e.g., a pre-canned SWF) that is part of the runtime. This code can instantiate a subclass of the HTML control that implements windowOpen, windowMoveTo, windowResizeTo, and windowClose. These methods can be implemented to open a new window, move the window, and resize the window. This code can also enable the injection of all runtime APIs into the first script type (e.g., JavaScript) object model. The runtime APIs can be added to object modules of all IFRAME and FRAME elements that have the same origin domain as the root HTML file. The preexisting code can be assigned to the same Security Domain as the root HTML content. When first type script (e.g., JavaScript) in any frame invokes a runtime method, the runtime method can execute with least privilege of any first type script (e.g., JavaScript) or second type script (e.g., ActionScript) code on the stack. The runtime method itself can be in the Security Context of the runtime.

Security model integrity can be maintained 360 by cross checking domain information for the HTML content and native content of the vector graphics rendering engine. When implementing the ability to embed HTML content in native content of the vector graphics rendering engine (e.g. HTML embedded in Flash® content), the system should guard against screen shot types of attacks, where the author of the native content can get access to the embedded HTML content, even when not appropriate. This can be prevented by recording the domain of any visible resource referenced by the HTML (e.g., images, frames, the HTML itself, etc.). When the native content attempts to take a screen shot of the HTML, the runtime can check to make sure that the native content came from the same domain as all of the visible resources for the referenced HTML. If the native content comes from a different domain than any of the visible resources, then the screen shot operation can be prevented. Alternatively, the domain of all resources associated with the HTML can be recorded, including non-visible resources (e.g., external scripts, external style sheets, etc.).

Furthermore, the HTML engine can have an HTML security model that is implemented on top of the Security Manager for the virtual machine. Every image (img tags, background images, CSS background images, etc.) and HTML file (including IFRAMES and FRAMES) can have an assigned Security Context. JavaSript code can be assigned a Code Context that is in the same Security Context as the HTML file that included its definition (either inline or via an external reference). Whenever the JavaScript engine calls a JavaScript function in a different security context, the security context stack can be pushed.

Thus, the JavaScript execution can be fully integrated with the security model employed by the virtual machine. Same origin checks can be implemented in terms of the virtual machine's security model. The security checks in the HTML engine for cross frame scripting and XMLHTTPRequest can be modified to thunk to the virtual machine's security manager. The XMLHTTPRequest implementation can be modified to use the virtual machine's security manager to decide whether or not to allow a request to a specified URL to proceed. When JavaScript sets window.domain, the security manager can also be notified.

When any of the second script type overrideable methods on the HTML control that implement parts of the first script type object model are called, the method can be made by default to run with the lowest privilege of any script code on the call stack. Note however, that the second type script implementing an overrideable method can also choose to use the virtual machine's Security Manager to escalate its privilege to the level of the Security Context of which that method is a part. IFRAMES and FRAMES can have security context assigned to them based on their URL and the domain of that URL.

Figure 4:
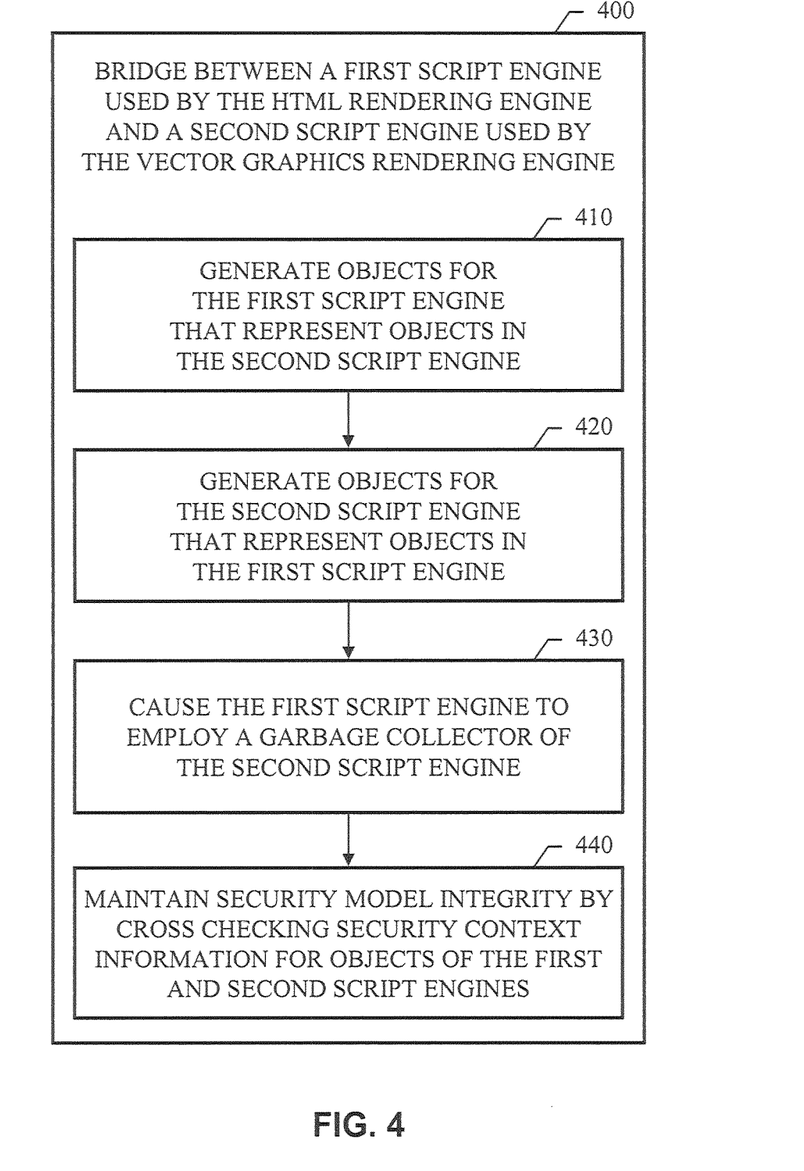
FIG. 4 shows an example process of bridging between a first script engine and a second script engine.

FIG. 4 shows an example process of bridging 400 between a first script engine (used by the HTML rendering engine) and a second script engine (used by the vector graphics rendering engine). Objects for the first script engine can be generated 410 that represent objects in the second script engine. Objects for the second script engine can be generated 420 that represent objects in the first script engine. The first script engine can be a JavaScript engine and the second script engine can be an ActionScript engine.

For example, an ActionScript function can have one or more arguments, and for each of these arguments, a JavaScript object can be created. Then, anytime a property is requested for that JavaScript object, or a method is called on that JavaScript object, the request can be forwarded back to the ActionScript object to which it corresponds.

Thus, a set of JavaScript objects can be created that represent all of the arguments to an ActionScript method. The system can call into the JavaScript engine to get the appropriate code and the function can be executed. As the function executes, when the function accesses a property or calls a method on an argument, this results in a transfer of control back to the ActionScript engine, where the results of those operations are obtained, wrapped with the JavaScript object(s) and handed back to the JavaScript engine. The converse operations can be performed when going from JavaScript into ActionScript. Thus, the system can use bridging objects between two different script engine, where the bridging objects represent objects in the other script engine.

The first script engine can be caused 430 to employ a garbage collector of the second script engine. Many scripting languages are "garbage collected", which means the script engine automatically identifies previously allocated memory that is no longer being used, and frees up that memory for future allocation (the garbage is collected). Typical garbage collectors operate by checking the program stack to find any memory objects that are no longer being referenced by the program, which thus indicates these memory objects are garbage to be collected. However, in the case of the use of bridging objects as described above, the two different script engines may not be able to see across the boundary spanned by the bridging objects, and thus the bridging objects may avoid being garbage collected. Note that the bridging objects can be implemented in C++ and exposed to the script engine as a script.

To address the garbage collection issue, one of the scripting engines (e.g., the JavaScript engine) can be changed to use the other scripting engine's garbage collector. Thus, every time the first script engine wants to create a new object, rather than allocate memory directly, the first script engine can request a memory allocation from the second script engine. The second script engine can employ a "conservative garbage collector", which is a garbage collector that finds references to objects by looking at all portions of the memory block allocated for an object to check for possible pointers (e.g., check every four bytes to see if it is a pointer to another object); since the objects in memory are known, the addresses are known and any potential object referencing pointer can be identified by the conservative garbage collector. By making the first script engine use a conservative garbage collector employed by the second script engine to allocate memory and to manage garbage collection, the bridging objects can be found and their memory freed up when it is no longer being used.

A script engine can be viewed as an interpreter that, in response to input, manipulates an object graph. Rather than having two object graphs for the two respective script engines, only a single object graph need be employed. The first script engine can be configured to use the object graph of the second script engine by interacting with the second script engine, and thus, the two script engines can be efficiently and effectively integrated.

Security model integrity can be maintained 440 by cross checking security context information for objects of the first and second script engines. The security context information can include domain information (e.g., Internet domain), transfer protocol information, and settings in the object's file. When bridging two script engines as described above, scripts of the second script type can hold references to, call methods on, and access properties of objects of the first script type, and vice versa. This can create an opening for scripting based attacks, which should be prevented.

Initially there are two references: a first object model and a second object model. The hosting content contains a reference to the global object of the hosted content and the hosted content has a reference to the object in the hosting content's object model that represents the hosted content. All other references to object that cross the boundary between hosting and hosted content can not exist until one of the original two references is used at least once. Whenever a script engine follows one those original references, a security check can be performed. The security check can have various inputs, including the calls stack of the script attempting to use the reference, the domain of each frame of the call stack, the domain of the referenced object, system preferences, and user preferences. The security check can use these inputs to determine whether or not the script engine should allow that reference to be followed. The security check code may use all or some subset of its inputs to reach a decision. Thus, scripting based attacks can be prevented.

Embodiments of the subject matter and the functional operations described in this specification can be implemented in digital electronic circuitry, or in computer software, firmware, or hardware, including the structures disclosed in this specification and their structural equivalents or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback, and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
   obtaining a function having an argument, the function corresponding to a first script engine of a first rendering engine;
   creating an object in a second script engine of a second rendering engine, wherein the second script engine is of a different type than the first script engine, and the object corresponds to the argument of the function;
   receiving a request with respect to the object in the second script engine;
   in response to receiving the request, transferring control to the first script engine to obtain a result corresponding to the request;
   receiving the result from the first script engine wrapped in the object of the second script engine;
   providing information based on the result to a vector graphics rendering engine;
   updating, based on the provided information, at least one primitive stored in the vector graphics rendering engine; and
   rendering primitives, including the at least one updated primitive, in the vector graphics rendering engine to a display device.

2. The method of claim 1, further comprising checking context information corresponding to the object of the second script engine before allowing a boundary between the first script engine and the second script engine to be crossed.

3. The method of claim 2, wherein the context information corresponding to the object of the second script engine comprises at least one of domain information and transfer protocol information.

4. The method of claim 2, further comprising forwarding a request for an external resource from the first rendering engine to the second rendering engine.

5. The method of claim 1, further comprising causing the first script engine to employ a garbage collector of the second script engine.

6. The method of claim 1, further comprising employing a single object graph for the first script engine and the second script engine.

7. A computer program product, encoded on a computer-readable medium, operable to cause data processing apparatus to perform operations comprising:
   obtaining a function having an argument, the function corresponding to a first script engine of a first rendering engine;
   creating an object in a second script engine of a second rendering engine, wherein the second script engine is of a different type than the first script engine, and the object corresponds to the argument of the function;
   receiving a request with respect to the object in the second script engine;
   in response to receiving the request, transferring control to the first script engine to obtain a result corresponding to the request;
   receiving the result from the first script engine wrapped in the object of the second script engine;
   providing information based on the result to a vector graphics rendering engine;
   updating, based on the provided information, at least one primitive stored in the vector graphics rendering engine; and rendering primitives, including the at least one updated primitive, in the vector graphics rendering engine to a display device.

8. The computer program product of claim 7, further comprising checking context information corresponding to the object of the second script engine before allowing a boundary between the first script engine and the second script engine to be crossed.

9. The computer program product of claim 8 wherein the context information corresponding to the object of the second script engine comprises at least one of domain information and transfer protocol information.

10. The computer program product of claim 7, further comprising forwarding a request for an external resource from the first rendering engine to the second rendering engine.

11. The computer program product of claim 7, further comprising causing the first script engine to employ a garbage collector of the second script engine.

12. The computer program product of claim 7, further comprising employing a single object graph for the first script engine and the second script engine.

13. A system comprising:
a display device;
a vector graphics rendering engine; and
a computer platform including an operating system and a runtime environment, the runtime environment configured to create a virtualized environment between the computer platform and a software application programmed to operate on the runtime environment, and generate a display interface for the software application using the display device,
wherein the runtime environment comprises a first script engine of a first rendering engine and a second script engine of a second rendering engine,
the second script engine is of a different type than the first script engine and is configured to:
create an object corresponding to an argument of a function in the first script engine;
receive a request with respect to the object in the second script engine; and
in response to receiving the request, transfer control to the first script engine; the first script engine is configured to:
obtain a result corresponding to the request, wherein the result is wrapped in the object of the second script engine; and
transfer the result to the second script engine; and
the second rendering engine is configured to provide information to a vector graphics rendering engine; and
wherein the vector graphics rendering engine is configured to:
update, based on the provided information, at least one primitive stored in the vector graphics rendering engine; and
render primitives, including the at least one updated primitive, in the vector graphics rendering engine to the display device.

14. The system of claim 13, wherein the runtime environment is further configured to check context information corresponding to the object of the second script engine before allowing a boundary between the first script engine and the second script engine to be crossed.

15. The system of claim 14, wherein the context information corresponding to the object of the second script engine comprises at least one of domain information and transfer protocol information.

16. The system of claim 13, wherein the first script engine is configured to employ a garbage collector of the second script engine.

17. The system of claim 13, wherein the first script engine and second script engine are configured to employ a single object graph.

18. The system of claim 13, further comprising:
a server computing device; and
a client computing device connected to the server computing device through a communication network, the client computing device comprising the computer platform.

* * * * *